(12) United States Patent
Gladstone et al.

(10) Patent No.: US 8,806,609 B2
(45) Date of Patent: Aug. 12, 2014

(54) SECURITY FOR REMOTE ACCESS VPN

(75) Inventors: Philip John Steuart Gladstone, Carlisle, MA (US); David A. McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 627 days.

(21) Appl. No.: 13/043,222

(22) Filed: Mar. 8, 2011

(65) Prior Publication Data

US 2012/0233674 A1 Sep. 13, 2012

(51) Int. Cl.
| | |
|---|---|
| G06F 7/04 | (2006.01) |
| G06F 17/30 | (2006.01) |
| G06F 15/16 | (2006.01) |
| H04L 29/06 | (2006.01) |
| H04L 9/32 | (2006.01) |
| G06F 21/00 | (2013.01) |
| H04L 9/08 | (2006.01) |

(52) U.S. Cl.
CPC ............ *H04L 9/085* (2013.01); *H04L 63/0853* (2013.01); *H04L 63/06* (2013.01); *H04L 63/0272* (2013.01)
USPC ....... 726/15; 726/9; 726/6; 713/171; 713/185

(58) Field of Classification Search
CPC . H04L 9/085; H04L 63/0853; H04L 63/0272; H04L 9/0897; H04L 63/06; H04L 63/065; H04L 63/08
USPC ....................................... 726/9, 15
See application file for complete search history.

(56) References Cited

U.S. PATENT DOCUMENTS

| | | | | |
|---|---|---|---|---|
| 5,771,459 | A | * | 6/1998 | Demery et al. ............... 455/517 |
| 6,028,937 | A | * | 2/2000 | Tatebayashi et al. ......... 713/169 |
| 6,292,896 | B1 | * | 9/2001 | Guski et al. ................... 713/169 |
| 7,000,121 | B2 | * | 2/2006 | Jarosz ............................. 726/15 |
| 7,055,027 | B1 | * | 5/2006 | Gunter et al. ................. 713/151 |
| 7,203,957 | B2 | * | 4/2007 | Balissat et al. .................. 726/15 |
| 7,234,058 | B1 | * | 6/2007 | Baugher et al. ............... 713/163 |

(Continued)

FOREIGN PATENT DOCUMENTS

EP       1024626 A1 *  8/2000   ................ H04L 9/08

OTHER PUBLICATIONS

Harkins et al., "The Internet Key Exchange", Network Working Group, dated Nov. 1998, 39 pages, retrieved from http://www.ietf.org/rfc/rfc2409.txt.

(Continued)

*Primary Examiner* — Carolyn B Kosowski
(74) *Attorney, Agent, or Firm* — Hickman Palermo Truong Becker Bingham Wong LLP

(57) ABSTRACT

Techniques are disclosed for improving security in virtual private network. In one embodiment, key information is generated for a virtual private network (VPN) connection between a first device and a second device. A plurality of shares is then generated based on the key information. A first set of one or more shares is stored on a dongle that is paired to the first device. A second set of one or more shares is stored on the first device. In response to a request to resume the VPN connection, the first set of shares is retrieved from the dongle. The key information is reconstructed based on the first set of shares and the second set of shares. The reconstructed key information may then be used to resume the VPN connection.

19 Claims, 5 Drawing Sheets

(56) References Cited

U.S. PATENT DOCUMENTS

| | | | |
|---|---|---|---|
| 7,565,529 B2 * | 7/2009 | Beck et al. | 713/156 |
| 7,688,975 B2 * | 3/2010 | Lin et al. | 380/44 |
| 8,296,825 B2 * | 10/2012 | Leone et al. | 726/4 |
| 8,356,101 B2 * | 1/2013 | Kumar et al. | 709/227 |
| 8,464,336 B2 * | 6/2013 | Wei et al. | 726/15 |
| 8,533,780 B2 * | 9/2013 | Parla et al. | 726/3 |
| 8,548,171 B2 * | 10/2013 | McGrew et al. | 380/277 |
| 8,599,788 B2 * | 12/2013 | Song et al. | 370/331 |
| 2005/0160269 A1 * | 7/2005 | Akimoto | 713/171 |
| 2005/0198532 A1 * | 9/2005 | Comlekoglu et al. | 713/201 |
| 2007/0033646 A1 * | 2/2007 | Tosey et al. | 726/15 |
| 2007/0156850 A1 * | 7/2007 | Corrion | 709/219 |
| 2007/0218912 A1 * | 9/2007 | Song et al. | 455/445 |
| 2007/0300221 A1 * | 12/2007 | Hartz et al. | 718/1 |
| 2009/0265553 A1 * | 10/2009 | Balissat et al. | 713/168 |
| 2010/0077204 A1 * | 3/2010 | Kawano | 713/153 |
| 2010/0223458 A1 * | 9/2010 | McGrew et al. | 713/153 |
| 2010/0275265 A1 * | 10/2010 | Fiske et al. | 726/26 |
| 2012/0084562 A1 * | 4/2012 | Farina et al. | 713/168 |
| 2012/0084838 A1 * | 4/2012 | Inforzato et al. | 726/4 |
| 2013/0191907 A1 * | 7/2013 | Falk et al. | 726/15 |

OTHER PUBLICATIONS

Kaufman C., Ed. The Internet Key Exchange (IKEv2) Protocol, Proposed Standard, Network Working Group, dated Dec. 2005, 99 pages, retrieved from http://tools.ietf.org/html/rfc4306.

Rescorla E., "Diffie-Hellman Key Agreement Method", Network Working Group, dated Jun. 1999, 13 pages, Retrieved from http://www.ietf.org/rfc/rfc2631.txt.

* cited by examiner

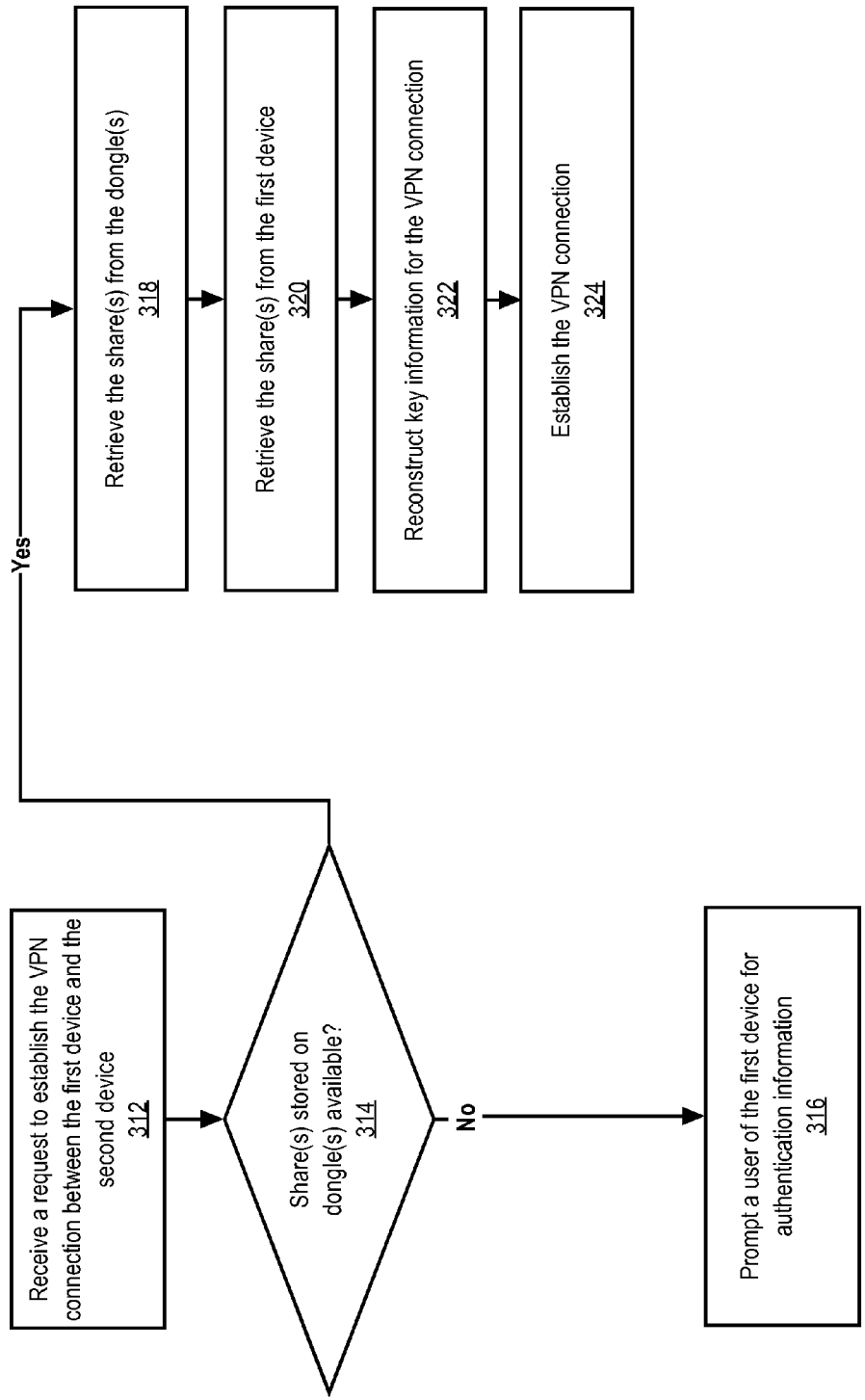

SECURITY FOR REMOTE ACCESS VPN

TECHNICAL FIELD

The present disclosure generally relates to data communications networks and, more specifically, to remote access of private networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Virtual private networks ("VPNs") allow secure communication between two or more devices over a public or non-trusted network. In a typical VPN arrangement, an end user is associated with an endpoint device, such as a workstation, personal computer, or mobile phone, which executes VPN client software. The endpoint establishes a connection through a non-trusted network, such as the public Internet, to a gateway or other network node, which executes VPN server software and is associated with a secure network of a business enterprise or other entity. The endpoint and network node negotiate encryption keys, essentially creating an encrypted "tunnel" connection through the un-trusted network. The endpoint and network node then communicate encrypted information over the un-trusted network, and the encrypted information is decrypted at the endpoints.

In this arrangement, the end user can securely obtain information from private network resources through the VPN tunnel, even though one or more intermediate networks are un-trusted. Typical VPN users are enterprise workers who telecommute or telework.

VPNs sometimes allow VPN sessions to last for long periods of time. For example, a VPN session may survive connection disruptions or power state changes on endpoint systems. Long-lived sessions reduce the frequency that the user needs to reauthenticate to the VPN server. However, long-lived sessions may reduce network security. For example, if the endpoint device is lost or stolen but a long-lived VPN session remains active, then the device could be used to gain access to the corporate network without needing any authentication information.

Two-factor authentication for VPNs may involve providing authentication data from a hardware token to VPN software on a separate machine. One example of a hardware token used for two-factor authentication is the RSA SecurID card. Typically, the hardware token (the card) generates authentication material at the outset of the VPN session when the user enters a Personal Identification Number (PIN) into the token. The user then copies the authentication material displayed by the token into the VPN software. This two-factor process protects the private network if the device running the VPN software is misplaced or stolen. However, this process is inconvenient for the user and can only be used at the outset of a VPN session; the process cannot be used to protect the secret data of an always-on VPN.

BRIEF DESCRIPTION OF THE DRAWINGS

In the drawings:

FIG. 3B illustrates an approach for resuming a VPN session in accordance with an embodiment.

DETAILED DESCRIPTION

Figure 1:
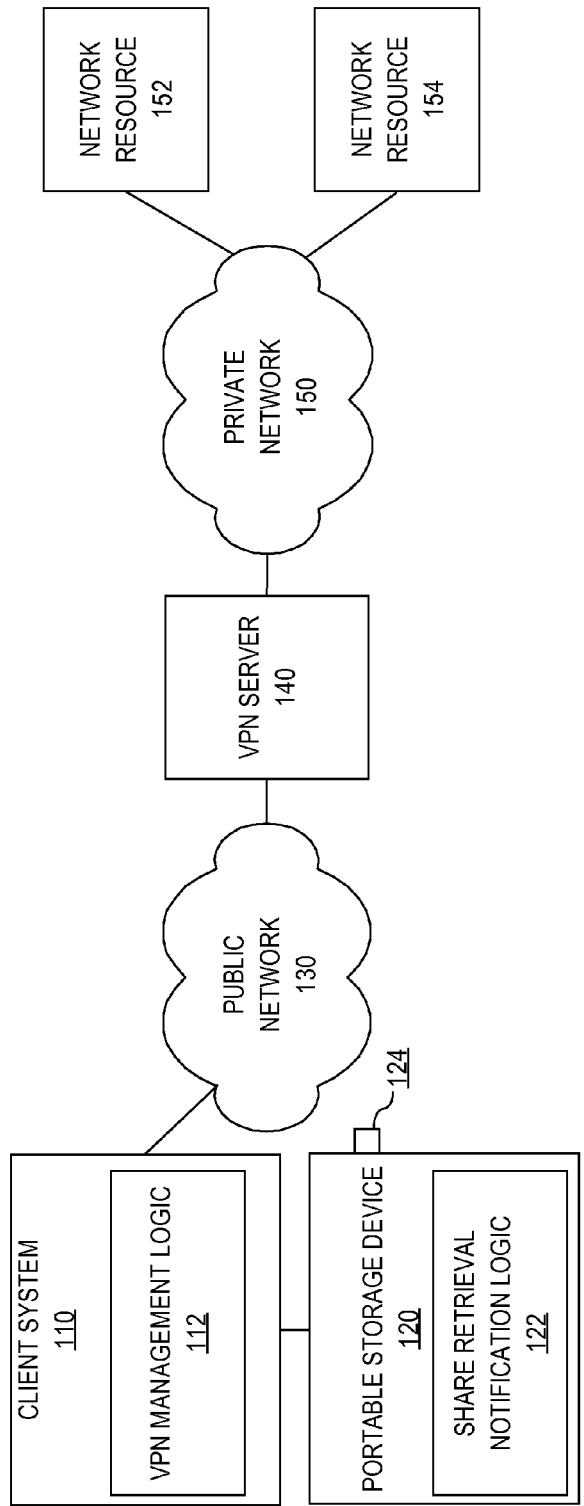
FIG. 1 illustrates a virtual private network that associates a portable storage device with a VPN client system in accordance with an embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Structural and Functional Overview
  3.0 Improving Security for Remote-Access VPNs
    3.1 Process of Splitting Secret Information
    3.2 Process of Establishing a VPN connection
  4.0 Implementation Mechanisms—Hardware Overview
  5.0 Extensions and Alternatives
  1.0 General Overview Techniques for improving security for remote access VPNs while maintaining the convenience of an automatically resumed VPN connection are described. In an embodiment, key information is generated for a VPN connection between a first device and a second device. A plurality of shares is generated from the key information for the VPN connection. The plurality of shares includes a first set of one or more shares and a second set of one or more shares. The first set of one or more shares is a different set than the second set of one or more shares. The first set of one or more shares is stored on a dongle that is paired to the first device. The second set of one or more shares is stored on the first device.

In one embodiment, in response to a request to establish the VPN connection between the first device and the second device, the first set of one or more shares is retrieved from the dongle. The VPN connection between the first device and the second device is established based on the first set of one or more shares and the second set of one or more shares. According to an embodiment, establishing the VPN connection between the first device and the second device based on the first set of one or more shares and the second set of one or more shares includes reconstructing the key information for the VPN connection using the first set of one or more shares and the second set of one or more shares.

In one embodiment, the key information includes one or more authentication keys associated with the VPN connection. The authentication keys are reconstructed using the first set of one or more shares and the second set of one or more shares.

In one embodiment, the key information includes one or more session keys for a VPN session associated with the VPN connection. The session keys are reconstructed using the first set of one or more shares and the second set of one or more shares. The reconstructed session keys are used to resume the VPN session associated with the VPN connection.

In one embodiment, it is determined that the first set of one or more shares transferred to the dongle is not available in response to a request to establish the VPN connection. In response to determining the first set of one or more shares is not available, the user of a first device is required to provide authentication information to reauthenticate the first device for the VPN connection.

In one embodiment, the first set of one or more shares are determined to be unavailable if the dongle is not paired to the first device.

In one embodiment, the first set of one or more shares are determined to be unavailable if it is determined that a time associated with the first set of one or more shares has exceeded the timeout value.

In one embodiment each share of the plurality of shares is stored on a different storage device including the first device and the dongle. In response to a request to establish the VPN connection between the first device and the second device, it is determined whether a minimum threshold of shares is available for retrieval by the first device. If the minimum threshold of shares is available for retrieval by the first device, the minimum threshold of shares is retrieved and used to establish the VPN connection between the first device and the second device. If the minimum threshold of shares is not available for retrieval by the first device, then a user of the first device is required to provide authentication information to reauthenticate the first device for the VPN connection.

In one embodiment, the first set of one or more shares includes a random encryption key generated by the first device and the second set of one or more shares includes ciphertext generated by applying the random encryption key to the key information for the VPN connection.

In one embodiment, the dongle is a Bluetooth device that is paired to the first device over a wireless Bluetooth connection or a Universal Serial Bus (USB) device that is paired to the first device over physical connection to a USB port physically coupled to the first device.

In one embodiment, the dongle is a Bluetooth Low Energy watch.

In one embodiment, the dongle includes a button that, when pressed, removes the first set of one or more shares from the dongle and/or a notification mechanism that notifies a user when the first set of one or more shares are transferred.

In other embodiments, the invention encompasses a computer apparatus and a computer-readable medium configured to carry out the foregoing steps.

2.0 Structural and Functional Overview

FIG. 1 illustrates a portable storage device associated with a VPN for purposes of establishing or reestablishing a VPN connection. VPN arrangements vary from implementation to implementation and the exact VPN arrangement illustrated in FIG. 1 is not required VPN client system 110 is located remotely from private network 150. "Located remotely," in this context, may mean within a non-trusted domain. In one embodiment, VPN client system 110 is a VPN endpoint device executing VPN client software. For example, VPN client system 110 may be a workstation, a laptop computer, a mobile phone, a personal digital assistant (PDA) or any other computing device capable of executing VPN client software.

VPN server 140 couples private network 150 to public network 130. Public network 130 may comprise the Internet, the public switched telephone network (PSTN), or any other type of data communication channel through which VPN client system 110 may communicate with VPN server 140. Private network 150 may comprise a Local Area Network (LAN), an enterprise network, or any other type of network that is trusted by an entity implementing VPN server 140.

VPN client system 110 initiates one or more VPN connections with VPN server 140 over public network 130. For example, VPN server 140 receives a request to create a VPN connection from VPN client 110. In response, VPN server 140 authenticates VPN client 110, negotiates encryption keys with the VPN client system 110, and establishes a VPN connection between the two systems. Negotiating encryption keys may involve performing Internet Key Exchange (IKE or IKEv2) as part of establishing a session under the Security Protocol for the Internet (IPSec), as described in IETF RFC 2409 and RFC 4306. Alternatively, negotiating encryption keys may involve performing RSA Key Exchange or Diffie-Helman Key Exchange (RFC 2631) as part of establishing a session under the Secure Socket Layer (SSL) or Transport Layer Security (TLS) protocol. The encryption keys are used by VPN client 110 and VPN server 140 to encrypt and decrypt data communicated between the two devices over public network 130.

VPN server 140 accepts VPN connections from one or more VPN client systems, including VPN client system 110. VPN server 140 is communicatively coupled to a plurality of network resources, including network resources 152 and 154, through private network 150. Network resources 152 and 154 may comprise a mail server, data server, or workstation. Once a secure communication channel has been established between client system and VPN server over public network 130, VPN client 110 may securely access data residing on private network 130. For example, a telecommuter using VPN client system 110 can retrieve email from a mail server, access data residing on a data server, or remotely logon to a workstation. VPN server 140 may comprise software, hardware, or a combination thereof. VPN server may be implemented on a variety of devices, such as a VPN concentrator, a router, or any other computing device capable of executing VPN server software. The secure channel may be a VPN tunnel.

VPN client system 110 includes VPN management logic 112 which manages VPN resumption credentials for VPN connections of VPN client system 110. VPN management logic 112 also associates portable storage device 120 with one or more VPN connections of VPN client system 110. At least part of the VPN management logic 112 may be implemented in VPN client software executing on a VPN endpoint device.

When VPN client system 110 establishes a VPN connection with VPN server 140 for the first time, VPN management logic saves VPN resumption credentials. VPN resumption credentials comprise information required to resume the VPN connection and associated VPN session at a later time. VPN management logic 110 generates two or more shares from the resumption credentials and causes VPN client system 110 to transmit a first share to portable storage device 120. The first share is then destroyed in the VPN client system 110. The first share may also have an associated timeout value indicating a time for which the share is valid. A second share is stored in non-volatile memory of the VPN client system 110.

When a VPN connection needs to be resumed between VPN client system 110 and VPN server 140, VPN management logic 110 requests portable storage device 120 for the first share, which portable storage device 120 provides. VPN management logic 110 reconstructs the resumption credentials from the first share and the second share and uses the resumption credentials to resume a VPN connection with VPN server 140. If the first share cannot be provided, for example, because portable storage device 110 is inaccessible or the first share has timed out, then a user of VPN client system 110 is required to reauthenticate with VPN server 140.

Portable storage device 120 stores shares of VPN resumption credentials and provides the shares to VPN client system 110 upon request. By splitting the resumption credentials into two parts and storing them in separate physical devices comprising the VPN client system 110 and portable storage device 120, the possibility that an unauthorized user can gain access to these credentials is minimized as they have to obtain both physical devices. Furthermore, the approach allows the improved user experience of not having to enter user credentials frequently.

Although only one portable storage device in FIG. 1 is illustrated, according to one embodiment, shares may be split across a plurality of portable storage devices, according to techniques described further below.

Portable storage device 120 may be any portable computing device capable of storing and transferring shares, including, but not limited to, a Bluetooth device, a Universal Serial Bus device, a mobile phone, a PDA, or a laptop. The compatible portable storage device may comprise a dongle. In the case that portable storage device 120 is a Bluetooth device, portable storage device 120 and VPN client system 110 may perform a mutual authentication based on a shared Advanced Encryption Standard (AES) key to encrypt the transfer of share data.

In one embodiment, portable storage device 120 is a Bluetooth Low Energy device. Bluetooth Low Energy devices are convenient for an end user because they are designed to be powered for years by a single coin cell battery such as a CR2032 type battery. Many different devices may support Bluetooth Low Energy. One example of a suitable device is a wristwatch. Mobile phone manufacturers may also incorporate dual-mode Bluetooth chips that can support both older Bluetooth technology and Bluetooth Low Energy. Bluetooth Low Energy technology provides a convenient means of storing shares as a Bluetooth dongle may easily fit on a key-chain or, in the case of a watch, on a wrist.

In one embodiment, portable storage device 120 is a USB device. The user may insert the USB device into a USB port on VPN client system 110 at the time that a VPN connection is established or reestablished, since these are the times that shares are written to or fetched from portable storage device 120. The user should remove the USB device from the VPN client system 110 in order to ensure that the dongle will not be stolen if the VPN client system is stolen. Thus, VPN management logic could refuse to establish or reestablish a connection while the dongle is still inserted in the VPN client system.

Portable storage device 120 may also optionally include button 124, which destroys all shares stored on portable storage device 120 when pressed. If VPN client system 110 is stolen, then the user may press button 124 to ensure that the information necessary to resume the VPN connection is destroyed.

Portable storage device 120 may also optionally include share retrieval notification logic 122. Share retrieval notification logic 122 notifies a user when a device is requesting the shares stored on portable storage device 120. For example, the portable storage device may vibrate, produce a sound, and/or blink. Share notification logic 122 may be especially helpful in the case where shares are sent to a VPN client over a Bluetooth or other radio signal. If an attacker attempts to steal the shares stored on portable storage device 120, then the user will be notified and can take actions to minimize the damage of the attacker (e.g., the user may notify a security administrator).

Figure 2:
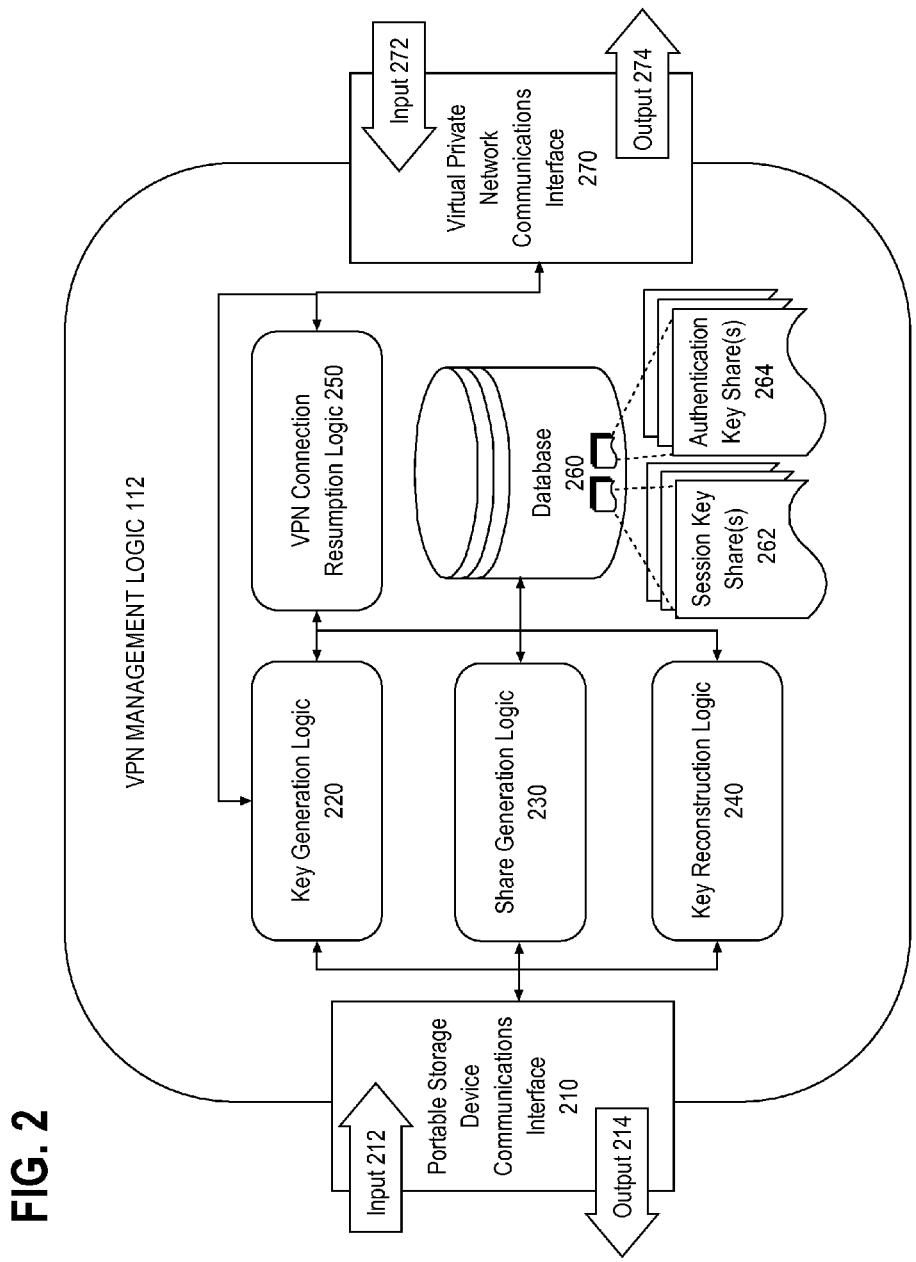
FIG. 2 illustrates virtual private network management logic in accordance with an embodiment.

FIG. 2 is a block diagram that illustrates virtual private network management logic 112 of FIG. 1. Referring to FIG. 2, key generation logic 220 generates key data for a VPN connection between VPN client system 110 and VPN sever system 140. The key data, which may serve as the resumption credentials, comprises information required to resume the VPN connection at a later time without requiring the VPN client system to reauthenticate with the VPN server system. According to one embodiment, the key data include authentication information. For example, the authentication information may include a username, password, security question answers and/or a digital certificate. In addition or alternatively, the authentication information may include one or more long-term VPN authentication keys. Example long-term authentication keys include private keys, such as an RSA signing key, or shared secret keys, such as an IKE pre-shared key, that are used at the outset of a VPN session to authenticate a VPN endpoint. The VPN session may be an IKE session, or an SSL, TLS, or DTLS session. The key data may also include one or more session keys that are used to encrypt and/or decrypt messages sent and received over the VPN connection. An ongoing VPN session typically has secret keys that are session specific. For IPSec, session keys include ESP and IKE phase two keys. For SSL, TLS, or DTLS, session keys are the keys generated from the pre-master secret.

VPN client system also includes share generation logic 230. Once key data has been generated by key generation logic 220, share generation logic 230 generates two or more shares based on the key data. The shares are generated so that each individual share gives no information about a secret value such as a key, but the shares can be combined to recover the secret value. Techniques for generating shares are discussed further below.

After share generation logic 230 has generated the plurality of shares, a first set of one or more shares is transferred to portable storage device 120 through portable storage device communications interface 210 and a second set of one or more shares is stored in database 260. The first set of shares is removed from VPN client system 110 so that it is not stored on VPN client system 110. The second set of shares is a different set of shares than the first set and is stored only on VPN client system.

Communications interface 210 comprises logic configured to communicate with one or more portable storage devices, such as portable storage device 110, and may vary from implementation to implementation. For example, communications interface 210 may comprise a Bluetooth interface, a USB interface, an IEEE 802.11, 802.15.4, and/or 802.15.6 compliant interface, proprietary RF technologies operating in one or more ISM bands including Nordic Semiconductors Shockburst technology, or any other suitable communications mechanism and communications protocols to communicate with paired devices. Communications device may also comprise authentication and encryption logic to authenticate and encrypt data that is transferred between the VPN endpoint device and the paired portable storage device. For example, an Advanced Encryption Standard (AES) key may be used to encrypt Bluetooth communications. Communications interface 210 receives input 212 from portable storage device 120 and sends data to portable storage device 120 via output 214

When a VPN connection needs to be resumed, key reconstruction logic 240 reconstructs the key information necessary to resume the VPN connection. Key information logic 240 fetches the first set of shares from portable storage device 110 through portable storage device communications interface 210 and fetches the second set of shares from database 260. Key reconstruction logic 240 reconstructs the key information based on the first and second set of shares.

VPN connection resumption logic 250 uses reconstructed keys to resume a VPN connection. VPN connection resumption logic provides VPN communications interface 270 with the key information necessary to resume the VPN connection. VPN communications interface 270 may then use this information to resume secure communications between VPN client system 110 and VPN server 140 over public network 130. If the VPN connection cannot be resumed (e.g., because the portable storage device is no longer paired to the VPN endpoint device), then VPN connection resumption logic 250 may prompt a user of VPN client system 120 to provide authentication information in order to reauthenticate with VPN server 140

VPN communications interface 270 comprises logic configured to communicate with VPN server 140. VPN communications interface 270 may comprises a network interface, such as an Ethernet or wireless interface, and may comprise one or more communications protocols establishing a VPN connection with VPN server 140. Communications interface 210 receives input 272 from VPN server 140 and sends data to VPN server 140 via output 274

In one embodiment, shares are generated for authentication key data associated with a VPN connection. For example, when a VPN endpoint is paired with one or more portable storage devices, the VPN endpoint device's long-term authentication key is split into two or more shares. If two shares are generated, then one share, authentication key share 264 is stored in database 260. The other authentication key share is stored on portable storage device 120 and is not stored on the VPN endpoint. In order to establish or reestablish a connection with the VPN server, the key reconstruction logic 240 fetches the authentication key share from portable storage device 120, and authentication key share 264 from its own non-volatile memory such as database 260. Key reconstruction logic 240 reconstructs the long-term authentication key, and then uses that key to set up a VPN connection. If the key was split into more than two shares, then each share stored on a separate portable storage device is fetched.

In one embodiment, shares are generated for session key data associated with a VPN connection. When the VPN software establishes a connection with the VPN server, it saves the information such as session keys required to resume a VPN session later. The session keys are split into two or more shares. If two shares are generated, one share, session key share 262, is stored in database 260, while the other session key share is stored on the portable storage device 120 and is not stored on the VPN endpoint. When a VPN session needs to be resumed, key reconstruction logic 240 fetches the session key share from portable storage device 120, and fetches session key share 262 from its own non-volatile memory (database 260), and reconstructs the session keys.

Figure 3A:
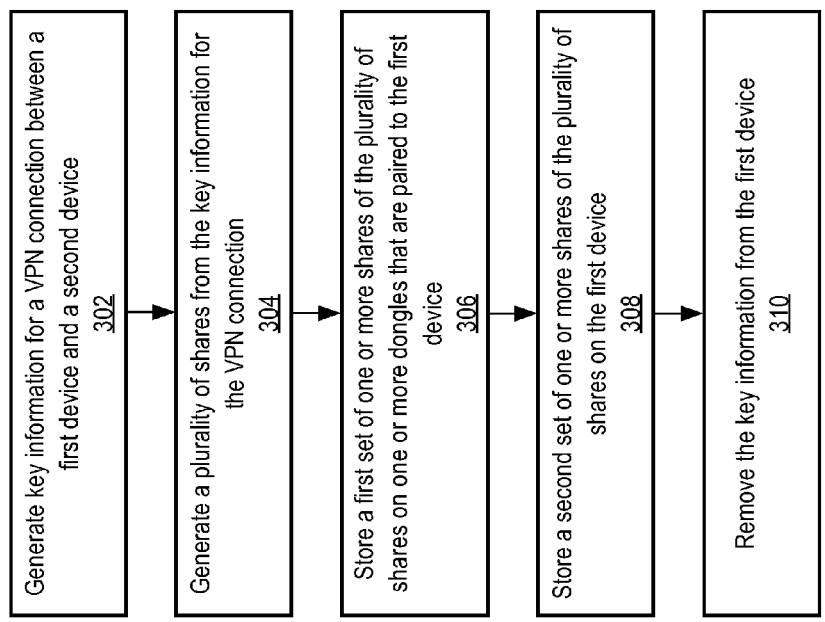
FIG. 3A illustrates an approach for splitting secret information for a VPN connection between plurality of devices in accordance with an embodiment.

3.0 Improving Security for Remote-Access VPNS 3.1 Process of Splitting Secret Information FIG. 3A illustrates an approach for splitting secret information between a first device and a dongle paired to the first device. In step 302, key information for a VPN connection between a first device and a second device is generated at the first device. Generating key information may vary from implementation to implementation. For example, generating key information may include, but is not limited to, the first device storing authentication information associated with a VPN connection or the first device negotiating VPN session keys with the second device. The key information may be generated in response to VPN client software, executing on the first device, establishing a connection with a VPN server for the first time.

In step 304, a plurality of shares is generated from the key information for the VPN connection. In one embodiment, the first device generates shares by encrypting the key information. For example, share generation logic 230 may generate a random key. Share generation logic 230 may use the random key to generate a ciphertext from the key information. The resulting ciphertext is one share, while the random key is the other share. The random key is transmitted to the dongle while the ciphertext is stored in the VPN endpoint device's non-volatile memory.

If more than two shares are needed, for example, when multiple portable storage devices are used to split shares, then a threshold cryptosystem such as Shamir's polynomial scheme can be used. When a threshold system is used, the number of shares needed to reconstruct the secret can be smaller than the number of shares that are created. For instance four shares can be created with a threshold of three, and each share can be installed on the VPN endpoint device and three dongles. Assuming the threshold is three, any two dongles will be able to activate the VPN endpoint and resume the VPN connection. A threshold cryptosystem can be used to increase the robustness of the overall system. For example, either of two dongles may be allowed to activate a VPN connection. Alternatively, a threshold cryptosystem can be used to increase security, for example, by requiring that multiple dongles be used simultaneously.

In step 306, a first set of one or more shares of the plurality of shares is stored on one or more dongles that are paired to the first device. In this description, references to plural dongles refer to one embodiment, and include the use of a single dongle in other embodiments; references to plural shares refer to one embodiment, and include the use of a single share in other embodiments. In one embodiment, the shares are transferred from the first device to the dongle. For instance, the first set of one or more shares may be transmitted wirelessly over a Bluetooth connection to a Bluetooth dongle or mobile phone. Alternatively, the first set of one or more shares may be transferred to a USB dongle via a USB connection. As indicated above, the first set of one or more shares may also be split between multiple dongles.

In step 308, a second set of one or more shares of the plurality of shares is stored on the first device. The second set of shares is different than the first set of shares. Furthermore, the second set of one or more shares is not stored on the dongles.

In step 310, the key information is removed from the first device, if needed. For instance, VPN client software may store the key information in volatile or non-volatile memory on the first device when establishing a VPN connection. In order to prevent an unauthorized user from accessing the private network, the key information is destroyed from the first device either during generation of the shares or after the shares have been generated. Furthermore, the first set of shares is also removed from the first device. Thus, the VPN connection may not be resumed without the dongle.

3.2 Process of Establishing a VPN Connection

FIG. 3B illustrates an approach to establishing a VPN connection based on secret information that has been split between two or more devices. In step 312, a request to establish a VPN connection between a first device and the second device is received. For example, the first device may attempt to automatically resume the VPN connection in response to the first device being turned on or, in the case of some mobile phones, flipped open. Alternatively, the first device may resume the VPN connection or establish the VPN connection for the first time in response to a user request. For example, the user may explicitly request to establish or reestablish the VPN connection using VPN client software executing on the first device. The VPN connection may also automatically attempt to resume after recovering from a power or connection failure.

In response to the request, at step 314 the first device determines whether the first set of one or more shares stored on the dongles is available. According to one embodiment, this step comprises determining whether the dongle is paired to the first device. For example, the dongle may not be within a close enough range of distance to pair with the first device. If the dongle is not paired to the device, then the shares stored on the dongle cannot be retrieved by the first device. As a result, the keys necessary to automatically resume the VPN connection cannot be reconstructed. Therefore, the user of the first device is required to reauthenticate with the VPN server.

According to one embodiment, the first set of shares stored on the dongles may optionally have an associated timeout value. The timeout value specifies a maximum period of time or a maximum period of inactivity for which the shares stored on the dongles are valid. In one embodiment, step 314 comprises determining whether a threshold period of time has elapsed that exceeds the timeout value. The determination can be performed either by the dongle or by the VPN endpoint device. If the threshold period of time has elapsed, then the shares on the dongles are determined to be invalid. Therefore, the user of the first device is required to reauthenticate with the VPN server, and the first device prompts the user to provide authentication information at 316.

In the case a threshold cryptosystem is used, if the minimum number of shares are not available, then the first device may determine that the shares necessary to resume the VPN connection are unavailable.

If the shares stored on the dongles are determined to be unavailable, then the process continues with step 316. In step 316, the user is prompted by the first device for authentication information to establish a VPN connection between the first device and the second device. For example, the user may be prompted for a username, password, answers to security questions and/or a digital certificate. Thus, the user is required to reauthenticate with the VPN server.

If the shares stored on the dongles are determined to be available, for example, when the dongles are paired to the first device, then the process continues to step 318. In step 318, the first device retrieves the first set of one or more shares from the dongles. For example, VPN client software executing on the first device may request the first set of shares from the dongles. In response, the dongles provide the shares to the VPN client software.

In step 320, the second set of one or more shares is retrieved by the first device. In one embodiment, VPN client software executing on the first device fetches the shares from the first device's non-volatile memory.

In step 322, the key information is reconstructed based on the first set of one or more shares and the second set of one or more shares. For example, if a first share is a random key and a second share is a ciphertext, the random key is used to decrypt the ciphertext and generate the key information. In one embodiment, authentication keys for establishing a connection and/or session keys for resuming a session are reconstructed by the first device.

After the key information has been reconstructed, the process continues with step 324. In step 324, the VPN connection between the first device and second device is established. As used herein, "established" may refer to establishing a VPN connection for the first time or resuming/reestablishing a preexisting VPN connection. In one embodiment, establishing the VPN connection comprises establishing or reestablishing a tunnel with a VPN server using one or more reconstructed authentication keys. In one embodiment, establishing the VPN connection comprises resuming a VPN session associated with the VPN connection using one or more reconstructed session keys. Alternatively, new session keys may be negotiated after the authentication keys have been reconstructed.

Thus, according to techniques described above, a VPN connection and/or session may automatically be resumed as long as the dongles storing the necessary shares are paired to the VPN endpoint device. This enhances the user-experience while maintaining a reasonable level of security. For example, if a user accesses an enterprise network using a smartphone, the user may keep a Bluetooth dongle on a key-ring so the user does not have to reauthenticate with the VPN server every time the user turns the phone on and off or puts the phone into sleep mode. The user is unlikely to lose both the smartphone and the key-ring at the same time, reducing the risk of unauthorized access to the private network.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
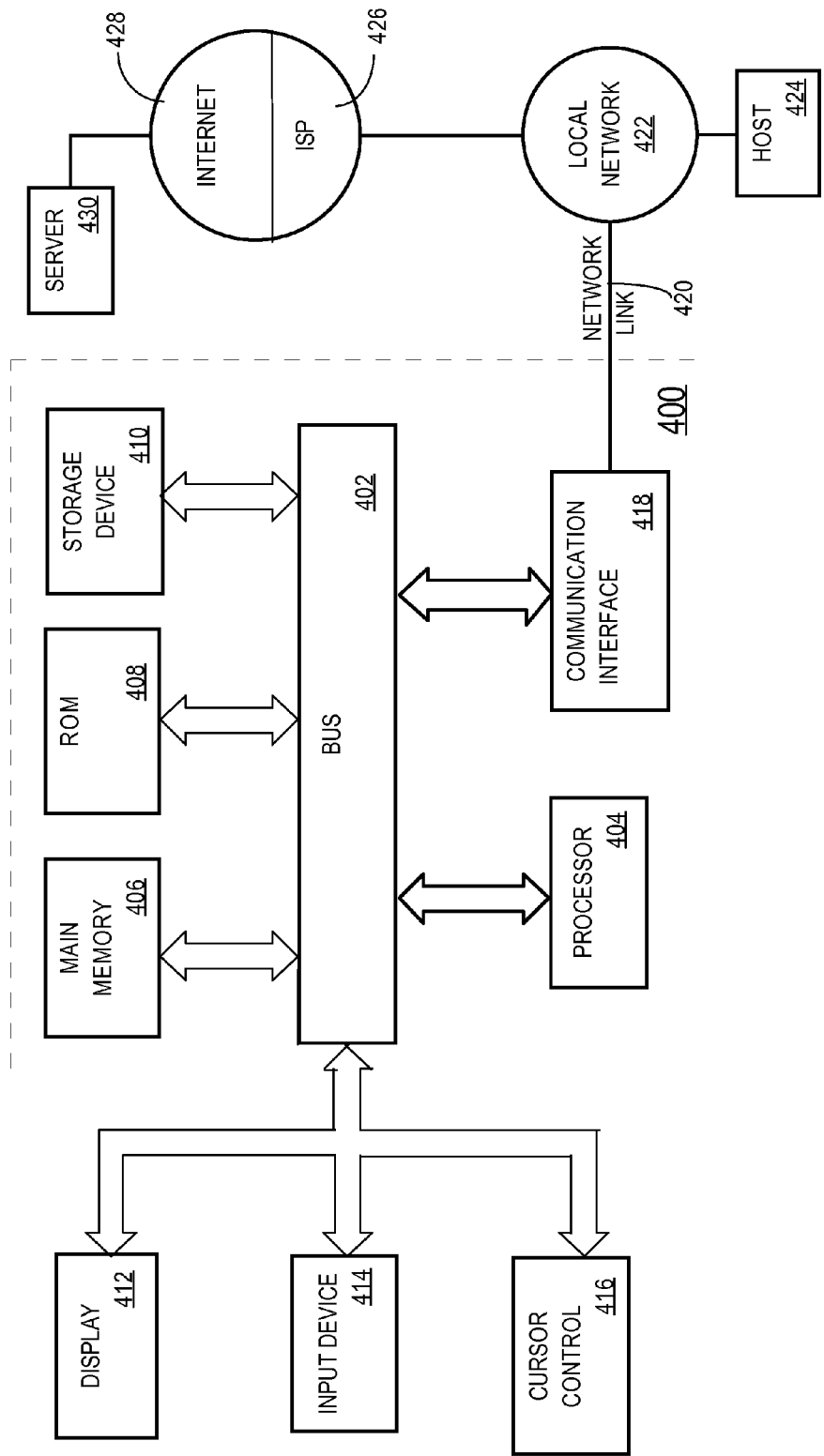
FIG. 4 illustrates a computer system upon which an embodiment may be implemented

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5.0 Extensions and Alternatives

According to techniques described above, a VPN endpoint system can use multiple dongles, and any storage device can act as a dongle. For instance, a user with a laptop, a smartphone, and a Bluetooth storage device could run two VPN endsystems, one on the laptop and one on the smartphone. The laptop could use the smartphone and the Bluetooth storage device as dongles, and at the same time, the smartphone could use the laptop and Bluetooth storage device as dongles. In addition, the connectivity/communications protocols between the VPN endpoint system and dongles may vary from implementation to implementation. For instance, at least the following technologies may be used to transfer data between the VPN endpoint system and the dongles: Bluetooth, USB, IEEE 802.11 (commonly known as Wi-Fi), IEEE 802.15.4 (includes Zigbee), IEEE 802.15.6 (Body Area Networks), and/or other proprietary RF technologies operating in one or more ISM bands, such as Nordic Semiconductors Shockburst technology. Other communications mechanisms not explicitly mentioned in the foregoing specification may also be used.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising;
generating, at a first device, key information for a virtual private network (VPN) connection between the first device and a second device;
wherein the key information comprises one or more session keys for a VPN session associated with the VPN connection;
generating, at the first device, a plurality of shares from the key information;
wherein the plurality of shares includes a first set of one or more shares and a second set of one or more shares;
wherein the first set of one or more shares is different than the second set of one or more shares;
causing the first set of one or more shares to be stored on a dongle that is paired to the first device;
causing the second set of one or more shares to be stored on the first device;
reconstructing the one or more session keys for the VPN session associated with the VPN connection using the first set of one or more shares and the second set of one or more shares;
resuming the VPN session based at least in part on the one or more session keys that were reconstructed using the first set of one or more shares and the second set of one or more shares.

2. The method of claim 1, further comprising, in response to a request to establish the VPN connection between the first device and the second device: retrieving the first set of one or more shares from the dongle; establishing the VPN connection between the first device and the second device based on the first set of one or more shares and the second set of one or more shares.

3. The method of claim 1, wherein the key information comprises one or more authentication keys associated with the VPN connection, the method further comprising reconstructing the one or more authentication keys using the first set of one or more shares and the second set of one or more shares.

4. The method of claim 1, further comprising in response to a request to establish the VPN connection between the first device and the second device: determining that the first set of one or more shares transferred to the dongle is not available; in response to determining that the first set of one or more shares transferred to the dongle is not available, requiring that a user of the first device provide authentication information to reauthenticate the first device for the VPN connection.

5. The method of claim 4, wherein determining that the first set of one or more shares transferred to the dongle is not available comprises determining that the dongle is not paired to the first device.

6. The method of claim 4, wherein the first set of one or more shares stored on the dongle is associated with a timeout value and determining that the first set of one or more shares transferred to the dongle is not available comprises determining that a time associated with the first set of one or more shares has exceeded the timeout value.

7. The method of claim 1, wherein each share of the plurality of shares is stored on a different storage device including the first device and the dongle, the method further comprising: in response to a request to establish the VPN connection between the first device and the second device:
determining whether a minimum threshold of shares is available for retrieval by the first device;
if the minimum threshold of shares is available for retrieval by the first device, retrieving the minimum threshold of shares and using the retrieved shares to establish the VPN connection between the first device and the second device;
if the minimum threshold of shares is not available for retrieval by the first device, requiring that a user of the first device provide authentication information to reauthenticate the first device for the VPN connection.

8. The method of claim 1, wherein the first set of one or more shares comprises a random encryption key generated by the first device and wherein the second set of one or more shares comprises ciphertext generated by applying the random encryption key to the key information for the VPN connection.

9. The method of claim 1, wherein the dongle is at least one of a Bluetooth device that is paired to the first device over a wireless Bluetooth connection or a Universal Serial Bus (USB) device that is paired to the first device over physical connection to a USB port physically coupled to the first device.

10. A non-transitory computer-readable medium storing instructions, which, when executed by one or more processors, cause performance of;
generating, at a first device, key information for a virtual private network (VPN) connection between the first device and a second device;
wherein the key information comprises one or more session keys for a VPN session associated with the VPN connection;
generating, at the first device, a plurality of shares from the key information;
wherein the plurality of shares includes a first set of one or more shares and a second set of one or more shares;
wherein the first set of one or more shares is different than the second set of one or more shares;
causing the first set of one or more shares to be stored on a dongle that is paired to the first device;
causing the second set of one or more shares to be stored on the first device;
reconstructing the one or more session keys for the VPN session associated with the VPN connection using the first set of one or more shares and the second set of one or more shares;
resuming the VPN session based at least in part on the one or more session keys that were reconstructed using the first set of one or more shares and the second set of one or more shares.

11. The non-transitory computer-readable medium of claim 10, further comprising instructions, which, when executed by the one or more processors, cause performance of: in response to a request to establish the VPN connection between the first device and the second device: retrieving the first set of one or more shares from the dongle; establishing the VPN connection between the first device and the second device based on the first set of one or more shares and the second set of one or more shares.

12. The non-transitory computer-readable medium of claim 10, wherein the key information comprises one or more authentication keys associated with the VPN connection the non-transitory computer readable medium further storing instructing, which, when executed by the one or more processors cause performance of: reconstructing the one or more authentication keys using the first set of one or more shares and the second set of one or more shares.

13. The non-transitory computer-readable medium of claim 10, further comprising instructions, which, when executed by the one or more processors, cause performance of:
in response to a request to establish the VPN connection between the first device and the second device:
determining that the first set of one or more shares transferred to the dongle is not available;
in response to determining that the first set of one or more shares transferred to the dongle is not available, requiring that a user of the first device provide authentication information to reauthenticate the first device for the VPN connection.

14. The non-transitory computer-readable medium of claim 13, wherein determining that the first set of one or more shares transferred to the dongle is not available comprises determining that the dongle is not paired to the first device.

15. The non-transitory computer-readable medium of claim 13, wherein the first set of one or more shares stored on the dongle is associated with a timeout value and determining that the first set of one or more shares transferred to the dongle is not available comprises determining that a time associated with the first set of one or more shares has exceeded the timeout value.

16. The non-transitory computer-readable medium of claim 10, wherein each share of the plurality of shares is stored on a different storage device including the first device and the dongle, the non-transitory computer-readable medium further comprising instructions, which, when executed by the one or more processors, cause performance of:
in response to a request to establish the VPN connection between the first device and the second device:
determining whether a minimum threshold of shares is available for retrieval by the first device;
if the minimum threshold of shares is available for retrieval by the first device, retrieving the minimum threshold of shares and using the retrieved shares to establish the VPN connection between the first device and the second device;
if the minimum threshold of shares is not available for retrieval by the first device, requiring that a user of the first device provide authentication information to reauthenticate the first device for the VPN connection.

17. The non-transitory computer-readable medium of claim 10, wherein the first set of one or more shares comprises a random encryption key generated by the first device and wherein the second set of one or more shares comprises ciphertext generated by applying the random encryption key to the key information for the VPN connection.

18. An apparatus comprising;
one or more hardware processors;
one or more stored sequences of instructions which, when executed by the one or more hardware processors, cause the apparatus to perform:
generating, at the apparatus, key information for a virtual private network (VPN) connection between the apparatus and a second device;
wherein the key information comprises one or more session keys for a VPN session associated with the VPN connection;
generating, at the apparatus, a plurality of shares from the key information;
wherein the plurality of shares includes a first set of one or more shares and a second set of one or more shares;
wherein the first set of one or more shares is different than the second set of one or more shares;
causing the first set of one or more shares to be stored on a dongle that is paired to the apparatus;
causing the second set of one or more shares to be stored on the apparatus;
reconstructing the one or more session keys for the VPN session associated with the VPN connection using the first set of one or more shares and the second set of one or more shares;
resuming the VPN session based at least in part on the one or more session keys that were reconstructed using the set of one or more shares and the second set of one or more shares.

19. The apparatus of claim 18, further comprising instructions, which, when executed by the one or more hardware processors, cause the apparatus to perform, in response to a request to establish the VPN connection between the apparatus and the second device: retrieving the first set of one or more shares from the dongle; establishing the VPN connection between the apparatus and the second device based on the first set of one or more shares and the second set of one or more shares.

* * * * *